United States Patent

Aakre et al.

[11] Patent Number: 4,730,251
[45] Date of Patent: Mar. 8, 1988

[54] AUTOMATIC I/O ADDRESS ASSIGNMENT

[75] Inventors: David E. Aakre, Kasson; Douglas J. Abrahamson, Rochester; Neil C. Berglund, Kasson; Vincent A. Bettermann, Rochester; Lloyd S. Heim, Oronoco, all of Minn.; Kenneth A. Moe, Los Gatos, Calif.

[73] Assignee: International Business Machines Corporation, Armonk, N.Y.

[21] Appl. No.: 791,884

[22] Filed: Oct. 28, 1985

[51] Int. Cl.⁴ .............................................. G06F 9/00
[52] U.S. Cl. .................................................. 364/200
[58] Field of Search ... 364/200 MS File, 900 MS File, 364/132; 340/825.52, 825.5

[56] References Cited

U.S. PATENT DOCUMENTS

| | | | |
|---|---|---|---|
| 4,360,870 | 11/1982 | McVey | 364/200 |
| 4,468,729 | 9/1984 | Schwartz | 364/200 |
| 4,630,224 | 12/1986 | Sollman | 364/550 |
| 4,633,392 | 12/1986 | Vincent et al. | 364/200 |

Primary Examiner—Gareth D. Shaw
Assistant Examiner—Kevin A. Kriess
Attorney, Agent, or Firm—Bradley A. Forrest

[57] ABSTRACT

An automatic address assignment system has a plurality of I/O devices coupled to a bus. Each device contains a unique machine-readable identifier which is used to select the device for address assignment. The identifier is a binary bit string. Each bit position in the bit string is selected by the host in a serial manner with the host specifying which binary value is being solicited. All devices whose identifier digit matches the solicited value respond positively and remain in contention for address assignment. The other devices will not respond and drop out of contention for address assignment until the sequence is restarted from the first bit. After the bit sequence is completed, the address for that device is bused to the device, and the sequence is restarted from the first bit until all devices have been assigned an address.

2 Claims, 3 Drawing Figures

AUTOMATIC I/O ADDRESS ASSIGNMENT

BACKGROUND OF THE INVENTION

This invention relates to the assignment of addresses to devices connected to a system by a bus, and in particular, automatic assignment of the addresses by the system in an efficient manner.

In computer systems, bus attached devices such as tapes, disk drives, monitors and other I/O devices require an address in order to be selected and used by the system. Typically, the address is predetermined and fixed by either physical location on the bus or by manual setting of switches or jumper wires. Many standard buses are not architected to use physical location to determine addresses, and manual setting of switches or jumper wires is prone to error even when performed by trained service personnel. There has been no efficient manner to accurately assign addresses without service personnel or operators actually taking the time to set the addresses for each I/O device. This is undesirable when systems are moving more toward customer setup and greater ease of use.

U.S. Pat. No. 4,360,870 to McVey describes a central processing unit which assigns addresses to I/O devices by first describing a device type and then assigning the addresses as a function of priority as established by the I/O devices of that type. This assignment scheme is dependent upon an established priority within a type of I/O device. It also requires the customer to have knowledge as to what types of devices are attached and to establish a priority for each I/O device.

IBM Technical Disclosure Bulletin, Vol. 24, No. 7B, December 1981, Programmable Assignment of Device Addresses, discloses a method of assigning addresses where the I/O devices are serially connected by a line. The addresses are assigned as a function of a priority wiring scheme and serial propagation. These methods are not available for use with many standard busses without undesirable alteration of the standard bus.

SUMMARY OF THE INVENTION

An automatic address assignment system has a plurality of I/O devices coupled to a bus. Each I/O device has a unique fixed length identifier and is capable of responding to information on the bus as a function of the identifier. The system selects the first bit in the identifier and transmits a binary value, '0' or '1' to the I/O devices. All devices having identifiers with a first bit matching the transmitted binary value respond. If no devices respond, the system transmits the opposite binary value for the selected identifier bit. If one or more devices respond, the system selects the next identifier bit and transmits a binary value again. Those devices that did not respond to the previously selected bit drop out of the assignment process until it is restarted with the selection of the first identifier bit. As successive identifier bits are selected, more I/O devices drop out of the assignment process until only one device remains after the last bit is selected, at which time the I/O device is given an address and does not respond to subsequent assignment sequences. The process is repeated starting with the first bit until all I/O devices have responded and have been assigned addresses.

The automatic address assignment does not require a user to set any switches, or place an I/O device in any predetermined sequence on installation. An I/O device can be added at any time and will be automatically assigned an address.

Since devices drop out of contention once they have been assigned an address, the assignment is very efficient. One device will be selected and assigned an address on each assignment sequence. Assignment sequences are repeated until no device responds to either transmitted binary value when the first identifier bit is selected.

DETAILED DESCRIPTION OF THE INVENTION

Figure 1:
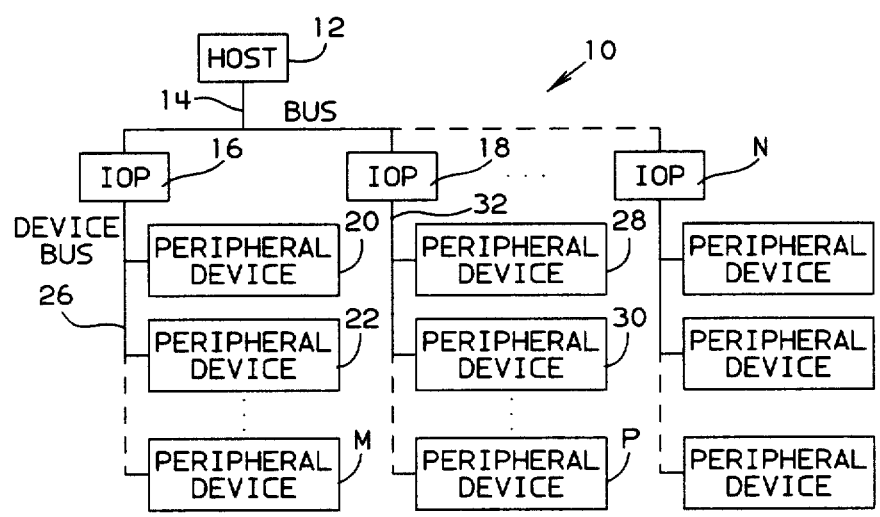
FIG. 1 is a block diagram of a host processor coupled to peripheral devices to be assigned addresses in accordance with the present invention.

A preferred embodiment of a computer system having automatic address assignment for its peripheral devices is indicated generally at 10 in FIG. 1. The system 10 comprises a host processor unit 12 coupled by a communicative means such as bus 14 to a plurality of input/output processors 16, 18, . . . N. I/O processor 16 is in turn coupled to peripheral devices 20, 22, . . . M by a communicative means such as a device bus 26. I/O processor 18 is also coupled to peripheral devices 28, 30, . . . P by a similar second device bus 32. Automatic address assignment is accomplished by I/O processors 16, 18, . . . N in operation with their corresponding peripheral devices. Host 12 could also use automatic assignment to assign addresses to I/O processors 16, 18, . . . N if desired.

Device busses 26 and 32 preferably comprise parallel buses having 24 signal lines:
  One interrupt line: ATTENTION.
  Three outbound tag lines: SELECT OUT, HOST OUT, SYNC OUT.
  Two inbound tag lines: DFC IN (device functional controller in), SYNC IN
  Two bi-directional busses, 9 bits each:
    BUS A (bits 0-7 plus parity),
    BUS B (bits 0-7 plus parity).

Normal device bus protocol assumes that peripheral device addresses are already assigned. Since at the start of operating a system, the addresses are not already assigned, a means of automatically assigning the addresses is provided. An alternative device bus protocol is provided to perform the automatic assignment and is referred to as maintenance mode. 18 of the 24 bus lines are divided into 6 groups of 3 lines each. Each one of the groups is operated as one signal line in the maintenance mode protocol. Majority voting of the three lines allows redundancy in the case of a single line failure which provides fault tolerant characteristics.

The device bus line assignments for the maintenance mode protocol is indicated in the following Table 1:

TABLE 1

| DEVICE BUS LINE NAME | MAINTENANCE MODE USAGE |
|---|---|
| SELECT OUT | . . . =0 Master Reset State |
| HOST OUT | . . . =0 set by IOP to invoke |

TABLE 1-continued

| DEVICE BUS LINE NAME | MAINTENANCE MODE USAGE |
|---|---|
| SYNC OUT | ... =1 maintenance mode hardware |
| DFC IN | ... not used |
| SYNC IN | ... not used |
| ATTENTION | ... not used |
| BUS B (bit 0) | ... DATA IN |
| BUS B (bit 3) | ... DATA IN |
| BUS B (bit 6) | ... DATA IN |
| BUS B (bit 1) | ... CLOCK IN |
| BUS B (bit 4) | ... CLOCK IN |
| BUS B (bit 7) | ... CLOCK IN |
| BUS B (bit 2) | ... RESPONSE IN |
| BUS B (bit 5) | ... RESPONSE IN |
| BUS B (bit P) | ... RESPONSE IN |
| BUS A (bit 0) | ... DATA OUT |
| BUS A (bit 3) | ... DATA OUT |
| BUS A (bit 6) | ... DATA OUT |
| BUS A (bit 1) | ... ENABLE OUT |
| BUS A (bit 4) | ... ENABLE OUT |
| BUS A (bit 7) | ... ENABLE OUT |
| BUS A (bit 2) | ... CLOCK OUT |
| BUS A (bit 5) | ... CLOCK OUT |
| BUS A (bit P) | ... CLOCK OUT |

Figure 2:
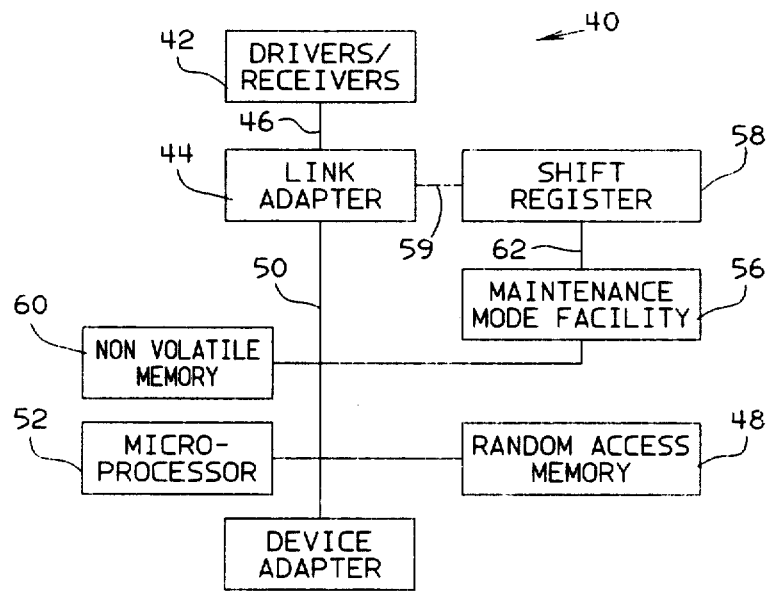
FIG. 2 is a block diagram of a controller for each peripheral device which facilitates automatic address assignment by the host processor of FIG. 1.

Each peripheral device comprises a device functional controller (DFC) which is indicated generally at 40 in FIG. 2 and controls communication between IOP 16 and peripheral device 20 in FIG. 1. Device bus 26 is coupled to drivers and receivers indicated at 42. The drivers and receivers both provide and detect signals on the individual lines of device bus 26 to enable communication. A link adapter 44 is coupled to the drivers/receivers 42 by a bus 46. Link adapter 44 contains control logic for executing device bus 26 protocols, and in normal operation, contains the device bus address so that bus selection and information transfer can occur.

Information is transferred across the device bus between the IOP and the DFC utilizing a random access memory 48 which is coupled to the link adapter 44 by a bus 50. A microprocessor 52 is also coupled to bus 50 and controls information transfer to and from memory 48.

When initially starting the system, or after new devices are added to the system, each device that requires an address activates its 'Attention In' line. The system then sets the three outbound tag lines to a master reset state. A maintenance mode facility indicated at 56 becomes active and a maintenance mode shift register 58 becomes ready to receive maintenance mode commands. Register 58 is coupled to link adapter 44 by a line 59, and receives the maintenance mode commands from link adapter 44. The maintenance mode facility 56 is coupled to register 58 by a bus 62 to receive the commands.

A non-volatile memory 60 is coupled to line 50 and contains a unique identifier for the peripheral device 20. Each peripheral device contains a unique machine-readable identifier in its non-volatile memory. The unique identifier is preferably a 48 bit binary string defining the unit type and serial number of the peripheral device.

In maintenance mode and when the command to perform address assignment is activated, IOP 16 selects each identifier bit position, one at a time, and the maintenance mode facility 56 accesses the identifier bit string from the non-volatile memory 60. The maintenance mode facility compares the identifier bit value with the value solicited by the IOP and either responds positively, if the values match, or drops out of automatic addressing mode if the values do not match. If the maintenance mode facility responds positively to all bits in the unique identifier, it remains the only facility still selected and the IOP sends the command to shift the assigned address into the maintenance shift register. The maintenance mode facility then moves the assigned address into the link adapter logic and the automatic address assignment is completed for the device.

Once the automatic address assignment has occurred, the maintenance mode facility in the DFC 40 will no longer respond to the commands for automatic addressing unless the assigned address is reset. This allows the IOP to assign each device a unique address by repeating the assignment operation, once for each device. Addresses can be changed by the IOP. The IOP first selects the device using the currently assigned address. Then a write to address register with the changed address accomplishes the change. Devices that have only fixed addresses ignore this command.

Automatic address assignment is based on a portion of the device's vital product data contained in the non-volatile memory 60. This vital product data comprises a 4 digit (2 byte) unit type field which is associated with the device when the customer orders the device with customer selected options, and an 8 digit (4 byte) serial number field which is the unique serial number for the particular device. The two fields are concatenated to form the unique identifier.

The following describes in further detail, the actions of the devices and the IOP's, beginning with a power on sequence. Each device (up to eight in this embodiment), as it becomes operational, activates the ATTENTION line of the device bus. The associated IOP responds to the ATTENTION line with a Power on Status poll to determine the address of the device looking for service. The address is normally presented at that time as a radial address as 1 of 8 bits (0-7) on the B bus. Automatically assignable devices that do not have addresses assigned will return the Parity bit as their radial address, thereby telling the IOP that at least one device needs an address assigned. At this time, devices with fixed addresses or automatically assignable devices which already have addresses assigned communicate their addresses to the IOP. A device with an address will respond to a "power on" poll by driving one of the bus B "in" lines which corresponds to its address. Thus, when assigning addresses, the IOP will not use any of the already assigned addresses.

The IOP then uses the maintenance mode protocol and issues an EXTENDED ORDER command. This command tells automatically assignable devices which do not have addresses assigned, to stay selected and proceed with the bit query/elimination process the next time Enable Out is raised. The automatically assignable devices that already have addresses, as well as non-automatically assignable devices, ignore the order. The IOP then drops Enable Out. A Read Sequence is signaled to the devices by setting Data Out=1 and then raising Enable Out, and the bit query/elimination process begins.

Figure 3:
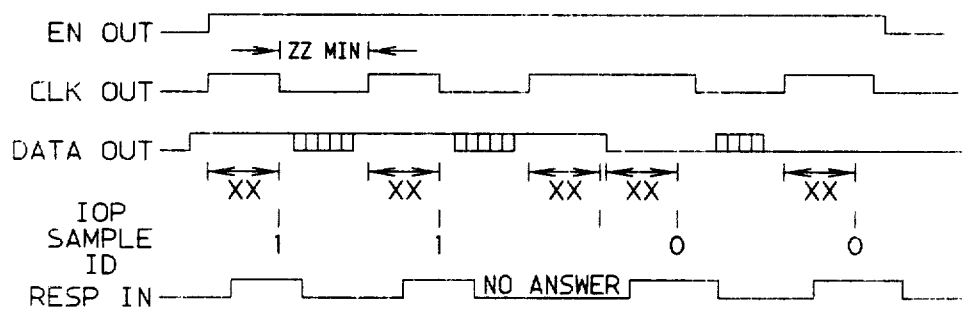
FIG. 3 is a timing diagram showing a bit query and elimination process of the automatic address assignment system of the present invention.

Timing relationships are indicated in FIG. 3 for the bit query/elimination process. Data Out is set to a "1", then Clock Out is raised by the IOP. All devices with the first bit of their identifier equal to the level of Data Out must respond with Response In. The first bit to be compared is the highest order bit of the Unit Type field, bit 0.

The IOP delays a predetermined number of microseconds, XX, (a function of hardware speed) after raising DATA OUT, and looks for RESPONSE IN active. If RESPONSE IN is active, CLOCK OUT is dropped and DATA OUT remains active. When the IOP drops CLOCK OUT, it also stores the value of DATA OUT so that it can accumulate the bit pattern of the identifier and remember which device address it assigned to that identifier.

After the IOP drops CLOCK OUT, the device drops RESPONSE IN and looks at the state of DATA OUT. If the state of DATA OUT is the same as the value of the first bit of that device's unique identifier, and the device had responded to the IOP, that device may remain selected in maintenance mode. At the same time, all other devices which are still selected, look at the state of DATA OUT and make the same comparison. If the state of DATA OUT and the value of the bit are not the same, the device must eliminate itself from this execution of the bit query/elimination process. The devices that eliminate themselves must not re-enter the bit query/elimination process until the process is restarted.

The query and elimination process continues with the next bit. There is a predetermined delay, ZZ, between the time the IOP drops CLOCK OUT and raises the next CLOCK OUT.

Each raising of CLOCK OUT, indicates to the devices still selected that the next bit of the unique identifier is being interrogated. Again, the device must compare the value of the next bit of its unique identifier, and the value of DATA OUT, and decide whether RESPONSE IN should be raised. Also, each device has to do the compare to DATA OUT at the time CLOCK OUT is dropped to decide if it should remain selected or must drop out of maintenance mode. This process continues until all 48 bits have been interrogated. At this point only one device remains selected, since each device has a unique 48 bit sequence.

At the end of the 48 bit query, another CLOCK OUT sequence is initiated with DATA OUT inactive (shifting out a 0 bit). The purpose of this last shift is to cause any device that could have powered up during the bit query sequence to consider the bit pattern to be a command and therefore ignore it, since that device would not have been previously selected.

Each device must be designed such that it will use the 48 bits of unique identifier data first, then concatenate zeros on the end of that data (add zeros to the low order end of the bit string), and therefore assume that any bits queried beyond the initial 48 bits are all zeros. The device should assume that it must keep doing the bit query sequence as long as the ENABLE OUT line remains active while the CLOCK OUT sequence is continuing. This capability allows the possibility of expanding the length of the unique identifier, should that become necessary in future releases.

Once Enable Out is dropped by the IOP, the device that remains isolated after the bit query sequence must assume that it is selected and accept the next order as a command. The IOP indicates a write sequence by raising Enable Out while Data Out=0, and passes a Source/Sink order to the selected device. The Source/Sink order indicates the address register as the destination for the bus address. Address 'OOOO'B is assumed by all automatically assignable devices as the address of the device address register. The Enable Out line is dropped, another write sequence is indicated, and a Data Transfer order is sent to the device. The Data Transfer order contains a 3 bit device address which is written into the device address register. After Enable Out is dropped, the device receiving the address no longer reacts to the address assignment command. The IOP then continues to address the other devices that do not have addresses, or stop the process if all devices are addressed. The IOP determines if any more devices need address assignment by doing another power poll and looking for a parity bit returned.

If at any time, the IOP determines that the address of any of the devices needs to be changed, maintenance mode is entered, and only the device which needs to change will be selected. At that time, a new address is assigned using the Source/Sink order, and the Data Transfer order.

While the above invention has been described with reference to preferred embodiments, it is recognized by those skilled in the art that further embodiments are within the scope of the invention. Configuration of the bus may be different. The addressing scheme could also be modified such that when a single device responds to the bit query, it is immediately assigned an address. Further intelligence built into the process could keep track of bit patterns successfully tried before, so as not to repeat unnecessary patterns. The use of current sensing receivers to detect more than one device driving the bus can be used to determine if only one device is responding. If only one device is detected as responding, it can be assigned an address prior to transmission of the complete unique identifier.

What is claimed is:

1. A method of assigning addresses to units attached by a bus having multiple lines, to a controller, wherein each unit has a unique identifier comprising a string of bits, comprising the steps of:
   (a) raising a first line of the bus if at least one unit does not have an address already assigned;
   (b) sending a status poll to the units if the first line of the bus is raised;
   (c) detecting address unique bus lines raised by units in response to the status poll indicating which addresses are already assigned;
   (d) sending a command to each unit to respond to address assignment signals if such units do not already have an address assigned;
   (e) sending a bit of identification data to each unit responding to address assignment signals;
   (f) causing each unit to respond to said bit of identification data if it matches a corresponding bit of unique identifier in a unit which is still responding address assignment signals;
   (g) causing each unit to stop responding to address assignment signals if said bit of identification data does not match a corresponding bit of unique identifier for said each unit;
   (h) changing the value of the bit of identification data if no unit responded in step f;
   (i) repeating steps e through h for a predetermined number of bits equal at least in length to the longest unique identifier;
   (j) assigning an address not previously assigned to the single unit still responding to address assignment signals; and
   (k) repeating steps b through j until all units have addresses assigned.

2. The method of claim 1 wherein when the predetermined number of identification bits is greater than the unique identifier of a unit, the unit will respond as though its unique identifier had bit values of zero for those identification bits greater than the unique identifier.

* * * * *